March 12, 1935.  J. JANDASEK  1,993,741
FLUID TORQUE CONVERTER
Filed Jan. 5, 1931  6 Sheets-Sheet 1

INVENTOR.
Joseph Jandasek

March 12, 1935.    J. JANDASEK    1,993,741
FLUID TORQUE CONVERTER
Filed Jan. 5, 1931    6 Sheets-Sheet 2

INVENTOR.
Joseph Jandasek

March 12, 1935.  J. JANDASEK  1,993,741
FLUID TORQUE CONVERTER
Filed Jan. 5, 1931  6 Sheets-Sheet 3

INVENTOR.
Joseph Jandasek

March 12, 1935.  J. JANDASEK  1,993,741
FLUID TORQUE CONVERTER
Filed Jan. 5, 1931   6 Sheets-Sheet 4

INVENTOR.
Joseph Jandasek

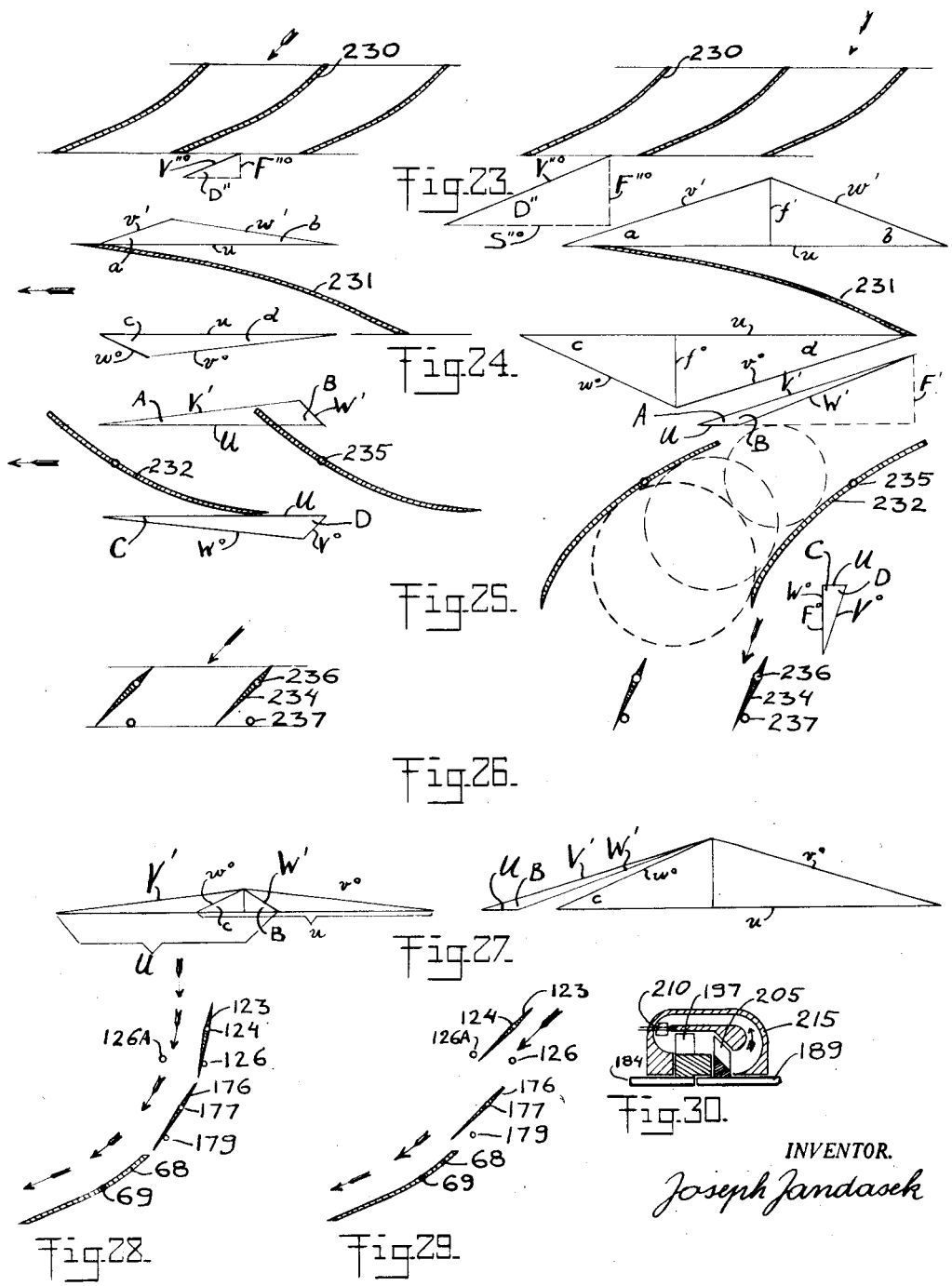

Inventor:
Joseph Jandasek

Patented Mar. 12, 1935

1,993,741

UNITED STATES PATENT OFFICE 1,993,741

FLUID TORQUE CONVERTER

Joseph Jandasek, Cicero, Ill.

Application January 5, 1931, Serial No. 506,636

14 Claims. (Cl. 60—54)

This invention relates to a new apparatus for transmitting torque and power from a primary or power generating member to a secondary or driven member by means of a transmitting medium, in such a way that while heavy torque is produced in the secondary member, at low speeds of the secondary member, only part of the energy generated by the primary member is absorbed by the secondary member, and the remaining energy is returned by means of a third stationary member to the primary member, producing an auxiliary torque acting in the direction of the rotation of the primary member, and in this way reducing the torque whch is necessary for driving the primary member. Said primary member is connected directly or indirectly to a power engine or other source of power, (not part of this invention); from it this member receives constantly its generating energy. Said secondary member is connected to a driven machine (not part of this invention) requiring a variable turning moment.

The method herein presented, of returning energy not absorbed in the secondary member to the primary member, is the same as the idea described more broadly in my copending applications Serial Number 304,634 filed Sept. 8, 1928, (now Patent Number 1,855,967, granted April 26, 1932), and Ser. Number 475,278 filed Aug. 14, 1930, but the present means of increasing the efficiency, as well as the construction of the apparatus are different, as will be apparent from the following description.

The invention provides a rotary mechanism for the transmission of power at varying speeds such that from any applied driving speed and torque a driven speed and torque are obtained of which the torque varies automatically in accordance with the load and the speed varies inversely as the torque, the efficiency being high throughout the whole range of speed.

A fluid power torque converter designed according to this idea consists principally of a plurality of impellers or generating members, creating a velocity and pressure energy as well as angular momentum in a circulating fluid, a plurality of adjustable and reversible driven members or turbine runners absorbing velocity and pressure energy as well as angular momentum from said circulating fluid, and stationary channels returning said fluid from the runner to the impeller, changing pressure energy of the fluid into velocity energy and increasing angular momentum of said fluid. (In Patent #1,855,967 and application Ser. No. 475,278 I have used only one such generator and one motor in each device and the motor was not adjustable nor reversible.)

The torque of the secondary members developed by apparatus constructed according to this method is adjustable and reversible, and can be several times greater at overload than at normal speed. Therefore my torque converter is especially suitable for propelling motor vehicles, locomotives, and other machines requiring high starting and reversible turning moment.

More particularly this invention relates to a turbo-transmission of that type in which a pump impeller, with small number of vanes sensibly of the same shape as that of the blades of a screw propeller, energizes a fluid which fluid in turn produces a desired rotation, in any direction, of the turbine runner, with a small number of vanes sensibly of the same shape as that of the blades of a screw propeller, by the fluid energy. The vanes of the pump impeller or the vanes of the turbine runner, or both vanes, may be rotated and adjusted so as to suit the direction of the fluid flow at all speeds and so as to effect direction of rotation of the turbine runner.

The main object of my invention is to increase automatically the turning moment in the driven member at heavy loads, to create a negative torque in said driven member at will, and to maintain the efficiency of the torque converter constantly high within a broad range of speeds by proper design and adjustability of the fluid energizing, or energy absorbing vanes, or both.

Another object of my invention is to provide a turbo-transmission of strong construction, which is enabled to run at the highest possible speeds without getting in danger of being disturbed by the influence of centrifugal forces or the pressure of the fluid. Another object of my invention is to make the inlet angles of impeller vanes as well as the outlet angles of runner vanes small in order to properly deflect the fluid flowing through the impeller and the runner, without increasing number of vanes or length of vanes, without increasing the wetted surface of vanes, and by avoiding the usual cellshape form of the impeller, runner and guide vanes. Another object is to simplify the manufacture of the vanes.

Another object is to provide a turbo-transmission with a guide wheel arranged in such a manner, that the fluid enters and leaves the guide wheel in substantially radial direction, while impeller and runner wheels are provided with axial fluid channels. The advantage of this combination is: an improvement of the guiding of the fluid and reduction of its frictional resistance and simplicity of construction of guide, impeller and runner wheels.

Another object is to provide an easy to operate method for controlling the direction of rotation of the driven member, for stopping the fluid circulation, and for the elimination of the guide wheel function, when desired.

To attain these and other objects, I have interposed in my turbotransmission between the outlet from the turbine runner and the inlet of the pump impeller stationary, nozzle shaped gates and several sets of semi-free vanes; said gates and vanes are to change the pressure energy of the fluid into the velocity energy, and to create an angular momentum in the circulating fluid of the same direction as the angular momentum imparted by the impeller. I have reduced the friction losses caused by the flow of fluid passing through the impeller and the runner, because I have designed the impeller and runner blades to guide the fluid as little as possible, so as to cause very little disturbance in the flowing and whirling fluid and to cause only free deflection of the natural flow, by keeping the area of all blades small in proportion to the circular area determined by the diameter of the impeller or the runner. (In Patent #1,855,967 and application Ser. No. 475,278 I have described an impeller and a runner with substantially cellshape form of vanes.) In the construction of a turbotransmission care must be taken to so regulate the impeller that a permissible turning moment is not exceeded for the simple reason that the engine would slow down. My impeller, therefore, has only two or four, either fixed or adjustable, blades whose entire blade surface is smaller than one half of the circular area determined by the diameter of the impeller wheel. In this case the disturbance of the normal flow through the impeller is slight, and a considerable increase of the turning moment on the part of the engine is avoided, the impeller cannot be so easily overloaded. In the case of runner, however, greatest possible increase of the turning moment is desired, and consequently I have designed my turbine runner with a smaller blade surface than the circular area determined by the diameter of the runner wheel, with a greater number of vanes, either fixed or adjustable, so as to cause the disturbance of the normal flow through the runner wheel greater, than in the case of the impeller, without increasing fluid friction.

In order to prevent the lowering of efficiency when fluid circulation and operating speed of the transmission changes considerably, and in order to obtain the reversibility of the transmission, I have constructed my torque converter with the runner wheel, or with the impeller wheel, or with both wheels comprising a series of rotatably mounted blades on the hub of the wheel, said blades adapted to vary their inlet and outlet angles by being rotated, and thereby to alter the inlet and outlet passages of the wheels according to quantity of the circulating fluid, according to the speed and the direction of the speed desired. In order to keep the dimensions of the transmitter, especially the diameter, and to keep the peripheral speeds of the wheels small, I have provided my transmitter with a number of impellers and runners working in series.

My fluid power torque converter in each and all of its forms includes pump impellers mounted on a primary or driving shaft, turbine runners mounted on a secondary or driven shaft and angular momentum increasing passages or gates interposed between the outlet of a runner and the inlet of an impeller. The said three parts being arranged in such relative positions that their passage systems comprise the main and complete circuit in which the fluid is capable of circulating and power transmitting.

With these and other objects in view, my invention consists in the combination, arrangement and construction hereinafter described, claimed, and illustrated in the accompanying drawings, it being understood that many changes may be made in the size, proportion of parts and details of construction within the scope of the appended claims, without departing from the spirit of the invention.

Some of the many possible embodiments of the invention are illustrated in the accompanying drawings, in which:

Fig. 16 is a view of a spur gear rack used for adjusting rotatably mounted runner blades.

Figure 24A:
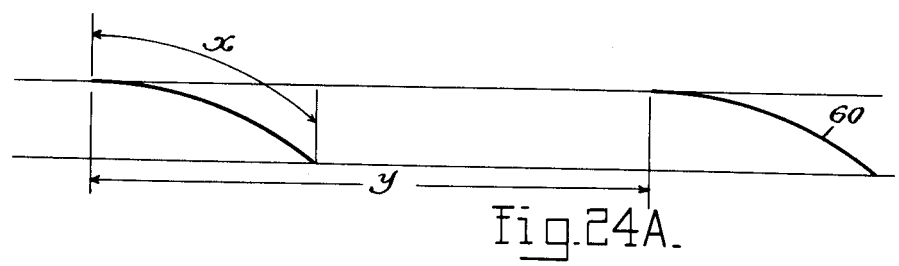
Figure 25A:
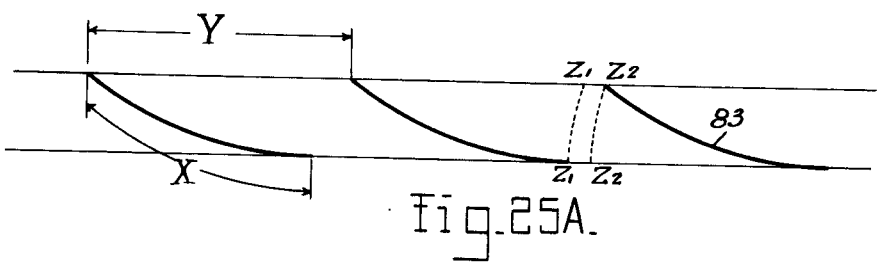

Fig. 23 illustrates the curvature of gates and fluid velocity diagrams; left diagram is for light load, right diagram is for overload. Fig. 24 shows impeller vanes and velocity diagrams, left for light and right for heavy loads. Fig. 25 represents runner vanes and their positions as well as velocity diagrams for light load (left) and for heavy load (right). Figs. 24A and 25A illustrate a diagrammatic development of impeller and runner blades as shown in Figs. 1, 10, 12, and 14 at light load. Fig. 26 illustrates semi-free vanes and Fig. 27 shows combined velocity diagrams for impeller discharge and for runner entrance at light load (left) and at heavy load (right). All Figures 23 up to 27 incl. illustrate functioning of the torque converter of Fig. 8.

Figure 1:
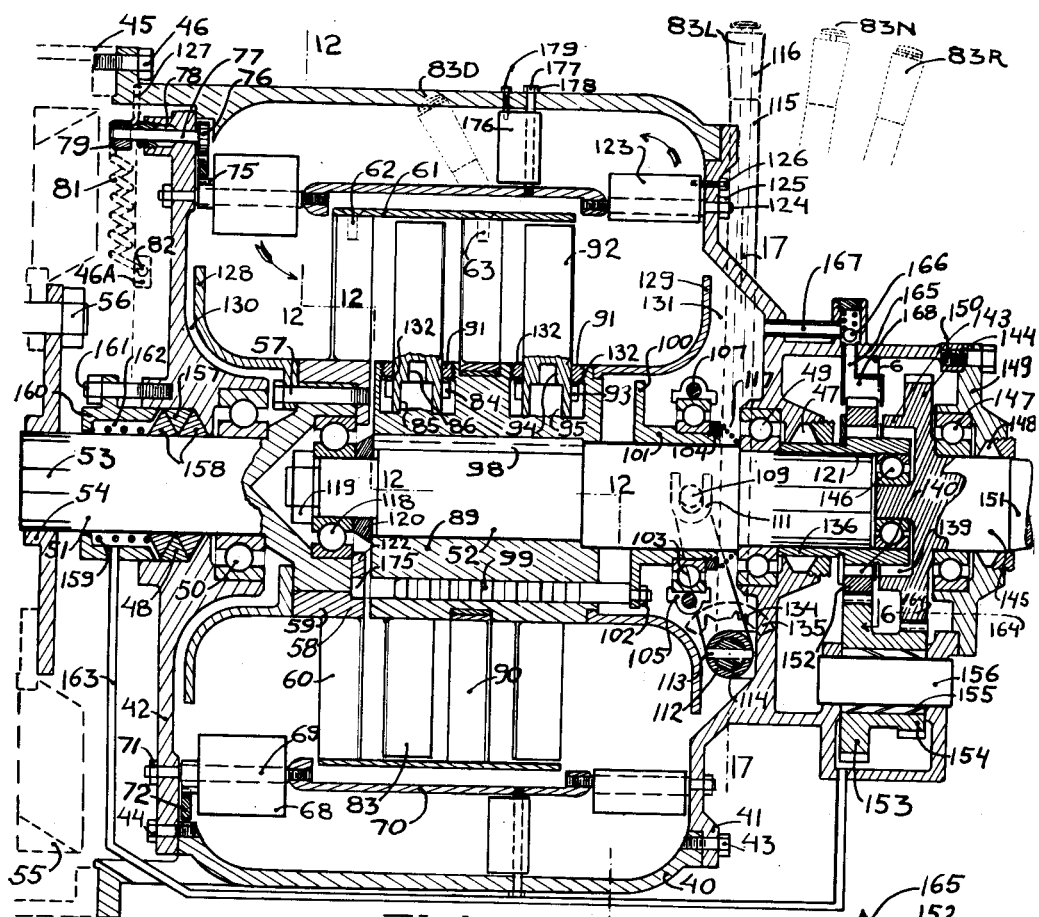
Figure 1 is a longitudinal section of a multistage turbotransmission equipped with runners and impellers, which are practically of the same shape as that of a screw propeller.

Fig. 28 illustrates action of gates and semi-free vanes of the mechanism of Fig. 1 at heavy load. Fig. 29 shows action of gates and semi-free vanes at light load.

Figure 8:
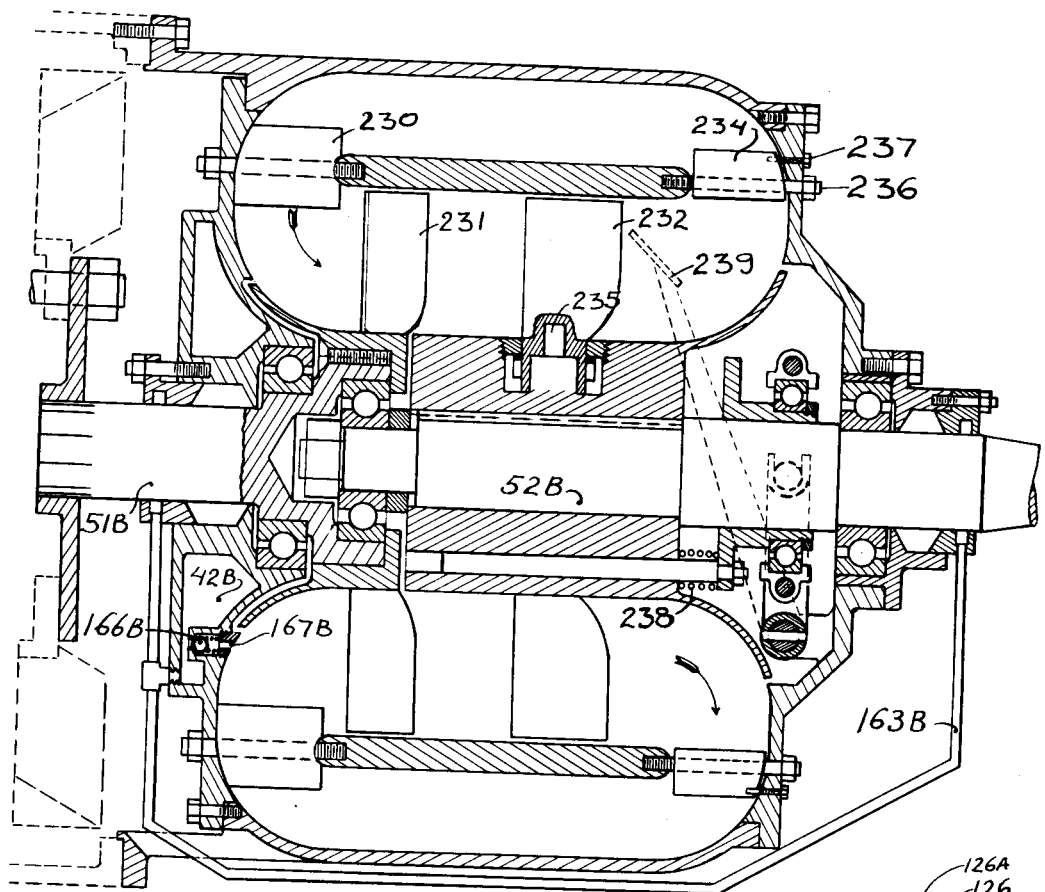
Fig. 8 is a longitudinal section of a single stage turbotransmitter equipped with one axial runner and one axial impeller, which are sensibly of the same shape as that of a screw propeller.

Fig. 30 is a half vertical section illustrating diagrammatically my torque converter similar to the device shown in Fig. 8 which, having an axial impeller, comprises a (partly radial inward flow runner.

Figure 12:
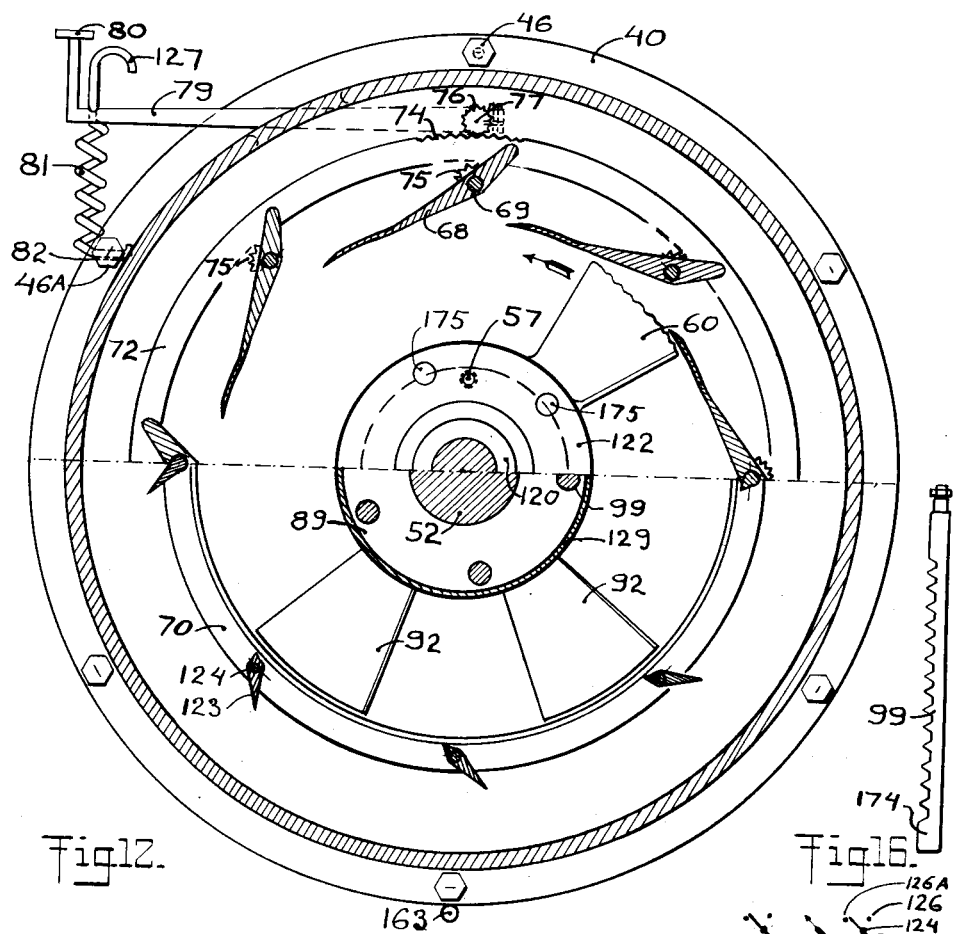
Fig. 12 is a vertical section of the transmission taken on line 12—12—12 of Fig. 1, showing the arrangement of gates and their control, impeller, runner and semi-free vanes.
Figures 13, 14:
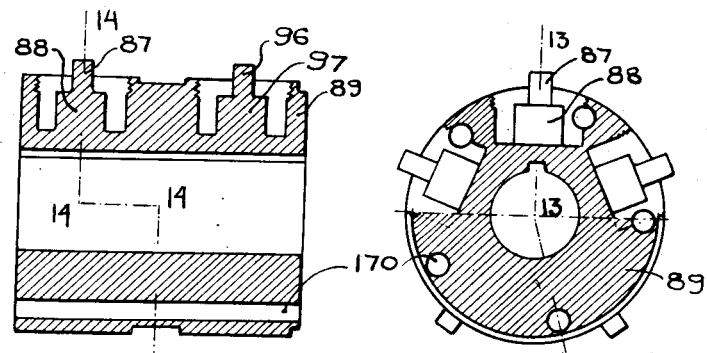
Fig. 13 is a vertical section through the runner hub taken on line 13—13—13 of Fig. 14.
Fig. 14 is a vertical section through the same hub taken on line 14—14—14 of Fig. 13.

The invention will be fully understood by referring to the accompanying drawings, forming a part of this specification, in which:

Figures 1 and 12 illustrate a form of my two stage fluid device, equipped with adjustable and reversible runner blades, and a mechanism for operating the runner blades, which apparatus is especially suitable for the propelling of motor vehicles. The numeral 40 indicates a main part of the fluid tight stationary casing to which covers 41 and 42 are fastened by bolts 43 and 44; casing 40 is rigidly secured to a flywheel housing 45 of a power engine by cap-screws 46. Covers 41 and 42 are provided with stuffing boxes 47 and 48 and with bearings 49 and 50 for the driving shaft 51 and the driven shaft 52; the driving shaft is secured by means of a spline 53 to a flange 54; this flange and the said shaft are so connected as to permit a relative axial movement, but prevent any relative rotary movement, this in order to facilitate manufacturing, assembling and installation of the transmitter. The flange 54 is fastened to a fan-shape flywheel 55 by means of bolts 56; the flywheel blows the air against the casing 40 in order to cool it. Mounted on the driving shaft 51 by bolts 57 is first impeller assembly 58, comprising a hub 59 integral with two fixed blades 60 sensibly of the same shape as that of screw propeller blades. A cylinder 61 is mounted rigidly to said blades 60 by means of screws 62; second impeller assembly (see also Fig. 10) is secured to this cylinder by screws 63; the second impeller assembly comprises two half rings 64 and 65, rigidly bolted together by screws 66, and a split bushing 67 with a sliding fit for turbine runner hub 89, to reduce friction between the impeller and said hub; this impeller has two vanes 90, which are similar to the vanes 60.

Function of the impeller in my device is exactly the same as a function of an axial pump impeller, i. e. generating pressure and velocity energy in a fluid and imparting an angular momentum in said fluid. At heavy loads, large quantity of fluid enters into the impeller and contains great amount of energy and angular momentum; compare with Fig. 24.

Figure 7:
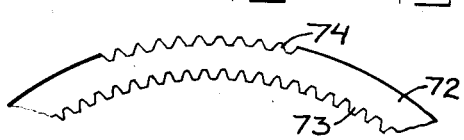
Fig. 7 illustrates a part view of a ring gear used for simultaneous rotation and adjustment of all guide gates.

The device for admitting the driving fluid into the impeller is constructed in such a manner as to offer the least possible resistance to the passage of the fluid. The wicket gates or pivoted guide vanes are designed in a similar way as known in water turbine construction, and their function is the same, i. e. changing the pressure energy of the fluid into the velocity energy and imparting an angular momentum in the fluid. Guide wheel assembly comprises a series of gates 68, each mounted on a fixed pivot 69, rear end of which, being threaded, is screwed in a front end of shroud 70, while the front end of pivot extends through the cover 42 and is rigidly secured to the same by nuts 71. The automatic and non-automatic adjustment of the gates is carried out by moving an adjustment ring gear 72 equipped with internal teeth 73 and external teeth 74 (see Fig. 7); said internal teeth of the ring meshing with external spur gear segments 75 which are integral with the vanes 68, turning around pivots 69. External teeth 74 of the ring are in mesh with spur gear pinion 76 integral with a shaft 77 extending through a stuffing-box 78 in the cover 42. To this shaft is rigidly clamped a lever 79 equipped with pedal 80, and a spring 81, the other end of the spring being fastened in a hole 82 of a bolt 46A. Ring gear 72 is held in position by cover 42 on one side and by the gates 68 on the other side. All gates 68 must rotate simultaneously about their pivots, because all the spur gear segments 75 are in mesh with the same ring gear 72; every position of the ring gear corresponds to a certain position of all the guiding gates.

Adjustable gates 68 are pivoted eccentrically; consequently the fluid pressure has a tendency to turn them about their pivots; this tendency is balanced by the spring 81; the stronger the fluid pressure the more the spring expands allowing small movement of the gates about their axis. At heavy load the fluid pressure increases, therefore the gates automatically open more than at light load, when the fluid pressure is smaller, because all the fluid energy was absorbed by turbine runner. By means of these gates the operator of a vehicle can partly unload the impeller (consequently the engine) by merely pressing on the pedal 80, which results in partly closing the gates, diminishing the fluid circulation, increasing the angular momentum of the fluid and speeding up the engine.

Because of the efficiency of the apparatus, it is an advantage to eliminate the action of the gates on long non-stop vehicle trips. Without the gates there are only the impeller and runner vanes effecting fluid flow, therefore my transmission becomes to be a mere hydraulic clutch where the torque of the secondary shaft T at all times is equal to the torque of the primary shaft $t$, which gives advantages of "direct drive" economy, because the slip of the runner amounts to only about 2 or 3%. This elimination of the gates function is accomplished by unhooking the spring 81 from the lever 79 by means of hook 127. In that way the spring 81 does not pull upon the lever 79, and eccentrically pivoted gates are free to adjust themselves to the rate and the direction of the fluid circulation, so that the fluid flows through the gates without impact and without an increase of angular momentum. As there is no other source changing angular momentum of the fluid in the fluid circuit, but the impeller and runner vanes, it is evident that: Sum of turning moments imparted to the fluid by the impeller $t$ and by the runner T equals zero, or:

$$t + T = 0 \qquad (1)$$

Whenever the operator feels that additional torque might be required, he hooks up the spring 81 back on the lever 79, which spring pulls said lever down, turns gates to their angular momentum imparting position, and my apparatus becomes again a torque converter with lighter torque at the primary shaft and heavier torque at the secondary shaft, whenever the fluid circulation increases.

Figure 11:
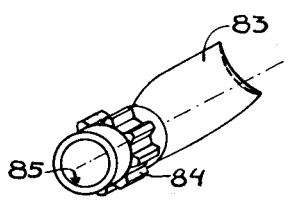
Fig. 11 is a perspective view of an adjustable runner blade.
Figure 10:
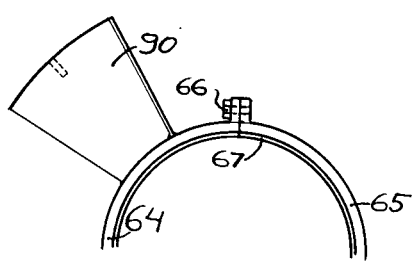
Fig. 10 represents a vertical view of one half of the second impeller.

At a reasonable distance from exit edges of the first impeller vanes, a first runner assembly is located, consisting of five blades 83 (see also Fig. 11), provided with spur gear pinions 84, split rings 132 and bearing portions 85 and 86. Said bearings are rotatably mounted on series of studs 87 and 88 (see also Figs. 13 and 14) of the runner hub 89, and are secured axially by nuts 91 screwed into the hub 89, which nuts prevent said blades sliding off by centrifugal force (the pinion 84 presses upon the ring 132, which in turn presses upon the nuts 91). At a reasonable distance from the first runner, leaving sufficient room for second impeller assembly, a second runner is located, consisting of a series (in this case preferably odd number) of rotatable blades 92, similar in shape to the blades 83, provided with spur gear pinions 93, split rings 132 (same as used for the blades 83), and bearing portions 94 and 95, rotatably mounted on studs 96 and 97, integral with the hub 89; said blades 92 are secured axially by nuts 91 (same as used for the blades 83), against centrifugal force. The force of reaction exercised by the fluid flow on the surface of the runner blades will be transmitted to the hub 89 and from the latter to the secondary shaft 52, to which the hub is secured by a key 98.

Figure 17:
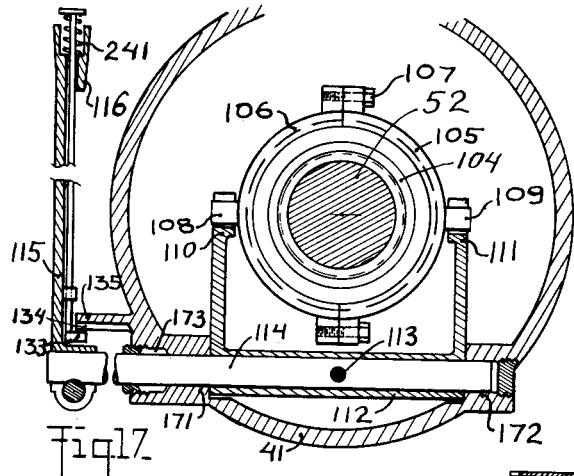
Fig. 17 represents a vertical section through the transmitter taken on line 17—17—17 of Fig. 1, and shows the construction of controlling and reversing mechanism.

The blades of the runner wheels may be adjusted as follows: each blade has a spur gear pinion 84 or 93 which is in mesh with one of spur gear racks 99 (for detail see Fig. 16); each rack is located in a hole 170, drilled in the hub 89, said holes provide for an axial displacement of racks, but force the said racks to participate in the rotary motion of the hub 89. All racks 99 are secured to one collar 100 of a sleeve 101 by means of nuts 102; to this sleeve is clamped inner race of a bearing 103 by a round nut 104. Outer race of said bearing is clamped by two half rings 105 and 106, bolted together by screws 107 (see Fig. 17). Said half rings are provided with studs 108 and 109 which fit into forks 110 and 111 integral with a sleeve 112; said sleeve is fastened by a pin 113 to a shaft 114, to which also a latch lever 115 with a handle 116 is rigidly clamped; the shaft 114 rotates in bearings 171 and 172 in the cover 41 and is provided with a stuffing box 173.

Figure 18:
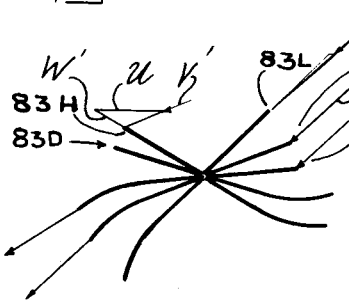
Fig. 18 illustrates positions of the runner vanes for high speeds, low speed, neutral and reverse speed.

Ordinarily the runner blades 83 and 92 are kept in position 83H (high speed, see Fig. 18) by a pressure spring 117; when pull in backwards direction is imparted to the handle 116 and the pressure of the spring 117 is overcome, all racks 99 slide through holes 170 toward the rear and all pinions 84 and 93 with blades 83 and 92 rotate about their supporting studs 87, 88 and 96, 97, until the runner blades come into position 83L (low speed); further pulling of handle turns said blades in neutral position 83N, and still further movement of handle turns the blades into position 83R (see Fig. 18). The angle of admission of the blade, thereby, will not only be increased, but also the area of the passages through the runners, especially discharge area, will increase and thereby, the energy output of runners will be greater without any material loss caused by eddies and shocks. When the pull on handle 116 is released, toothed rods 99 slide forward by the action of spring 117, and the blades will be turned in the opposite direction, narrowing the passages through the runner wheel, diminishing the inlet and outlet angles and thereby diminishing available torque of runners. Pushing further upon the handle 116, ends 174 of rods 99 slide into corresponding holes 175 in the impeller hub 59, locking the impeller hub with the runner hub for "direct drive", position 83D.

The blades of impellers as well as the blades of runners both revolving at a very high rate of speed (especially on modern automobiles) are much affected by centrifugal force; therefore, in order to eliminate this, I have designed the blades of impellers and runners substantially radial.

The control lever 115 can be secured in neutral, reverse and direct positions only, by means of a spring 241 and a latch 133 (of any well known construction, for instance, thumb latch lever), which fits in grooves 134 of a lug 135 integral with the cover 41. High speed and low speed positions or any other position between, is automatic and is determined by the fluid pressure against the blades 83 and 92 and by the pressure of the spring 117. Blades 83 and 92 are eccentrically pivoted (see Fig. 18), because centerline of studs 87, 88 or 96, 97 is not in the center of blade surface but is located closer to leading edges of the blades adjacent to the outlets from the impellers, so the blades can adjust themselves to the rate of discharge from the impellers; the stronger the fluid circulation, the greater the pressure of the fluid upon the surface of the blades, and consequently the blades turn more toward 83L position (see Fig. 18) and the more the spring 117 is compressed; the lighter the circulation, the smaller the fluid pressure and the more the blades are turned toward position 83H, in Fig. 18, by means of the spring 117. Movement of runner blades from low speed position 83L up to high speed position 83H is automatic; neutral position 83N and reverse 83R and direct position 83D can be caused only by applying pressure upon the latch lever 115.

Generally the function of the runner at high speeds is the same as action of an axial (propeller type) reaction turbine, i. e. extracting the momentum and energy from the circulating fluid. At heavy loads its function is to absorb angular momentum and part of the energy from the fluid and to change the remaining part of velocity energy of the fluid into the pressure energy (compare with Fig. 25).

Figure 9:
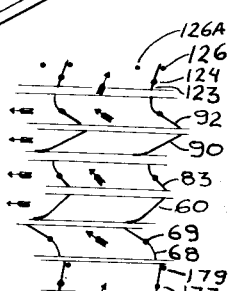
Fig. 9 illustrates a diagrammatic development of the shape of vanes in my power transmitter of Fig. 1, at heavy loads.
Figure 9R:
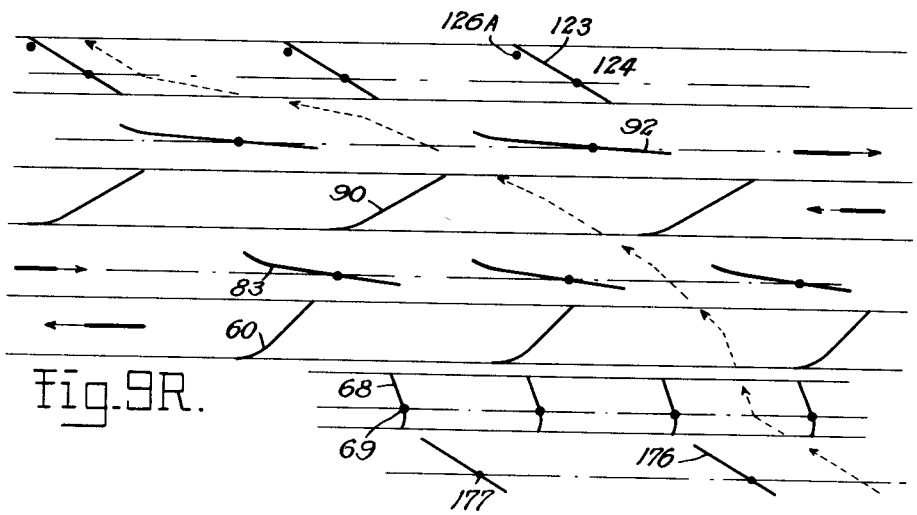
Fig. 9R shows a diagrammatic development of the vanes in the transmission of Fig. 1, when reversing.

Fig. 9R has been drawn with the runner blades in the "reverse" position and showing by arrows the directions of flow and rotation. Curvature of arrows indicates the direction in which flow is deflected in each set of vanes. It is to be noted that deflection of fluid in a runner is of the same direction as deflection of fluid in an impeller; therefore fluid reactions created by fluid impacts in a runner as well as in an impeller act in the same direction, now the fluid reaction in impeller is opposite to the direction of impeller rotation, while rotation of runner is caused by fluid impact and therefore must be of the same direction as the impact, consequently runner must rotate in the opposite direction as impeller; also of importance it is to see that the turning moment of the guide wheel at reverse is in opposite direction than at overload, because fluid when reversing is deflected in guide vanes in the opposite direction than at overload.

Fig. 9R illustrates that the direction of turbine vanes 83 and 92 in "reverse" is similar to that for "low speed" as shown in Fig. 9, the only difference being that on "reverse" the blades are set at a sharper angle as in "low"; in the Fig. 9R the blades are turned further in anticlockwise direction as in Fig. 9, see also Fig. 18.

Let the driving vanes deflect the flow through an angle $a^x$, the driven vanes through an angle $b^x$, and the guide vanes through an angle $c^x$, it is obvious that in closed cycle sum of these angles must be equal to zero, otherwise deflection of the flow would increase indefinitely, which is impossible; therefore:

$$a^x + b^x + c^x = 0 \qquad (33)$$

If there were no stationary guide vanes somewhere in the fluid path their angle $c^x=0$, and equation (33) would change into: $a^x=-b^x$ which means: in a cycle of fluid flow comprising only driving and driven vanes the angle of flow deflection of driving vanes is always equal and opposite to the angle of flow deflection of driven vanes. Therefore no reverse can be obtained without guide vanes.

At light load: guide vanes do not act therefore: $c^x=0$ and consequently:

$$a^x = -b^x \qquad (34)$$

At heavy load: guide vanes impart additional turning moment in the fluid helping impeller, deflection due to guide vanes is positive, therefore in the same direction as impeller deflection. Hence: $a^x + c^x = -b^x$, flow deflection due to runner vanes is negative in relation to impeller deflection.

When reversing: runner vanes move in the opposite direction as impeller vanes, their reaction must be in the same direction as rotation of the impeller therefore: deflection due to runner vanes is positive relatively to impeller deflection, $b^x$ is $+$, then: $a^x + b^x = -c^x$.

Consequently, at reversing, sum of impeller and runner deflection equals negative value of guide wheel flow deviation. Further, guide wheel flow deflection is negative, and therefore opposite to guide wheel flow deflection at heavy load.

Secondary shaft 52 being supported by bearing 49 is held axially and radially by inner race of bearing 118 secured to the shaft 52 by nut 119 and spacer 120, and is provided with a spline fitting 121 for the attaching of an inner driving member of a ratchet mechanism. Outer race of bearing 118 is clamped to the shaft 51 by a flange 122 which is integral with the hub 59 of the first impeller. Whatever pressure differences in whichever direction, radial or axial may exist between impellers and runners it will be caught by the bearing 118, what makes the impellers and the runners a selfcontained unit so there is no axial thrust exerted upon bearing 49 or 50.

The cover 41 serves also as a case for a train of gears designed for purpose of increasing torque of my device in "reverse" direction. As mentioned above the runner blades can be turned to a position 83R and the runner will revolve in the opposite direction, because the fluid is impinging the runner blades on the back sides (see Fig. 18) but the reverse torque, thus developed, is less powerful than the torque developed in "forward" direction, owing to the curvature of blades. Therefore, when powerful reverse torque is required, the torque of my apparatus in reverse direction must be multiplied by means of gears, while forward drive must be direct because of the economy of the operation and noise of gears. For this purpose I have used one forward and one reverse "one way clutch" or ratchet. This ratchet mechanism can be of any well known construction, but I prefer a roller ratchet. A driving member 136 for both ratchets is pressed on the spline 121 of the secondary shaft 52 (see also Figs. 3, 4, 5, 6). Ratchet driving member 136 is equipped with two sets of wedges: forward 137 and reverse 138, and with two series of rollers: forward 139 and reverse 140; flat split rings 141 and 142 holding said rollers axially in position. A driven member for forward ratchet in form of a ring 143 integral with a gear 144 is one piece with a third shaft 145; said shaft supported by bearings 146 and 147 is carried through a stuffing box 148 in a cover 149, which cover is secured to the casing 41 by bolts 150; the shaft 145 is provided with a taper fitting 151 for attaching of a propeller shaft (not shown) for a vehicle drive. A driven member for reverse ratchet is a ring gear 152 which is in mesh with a gear 153, integral with a gear 154 which is in mesh with a gear 144; the double gear 153 and 154 is carried on roller bearings 155, which are supported by a pin 156 pressed in the case 41.

When runners are revolving in forward direction (clockwise looking from the front), wedges 137, rollers 139 and ring 143 being in contact are pressed together more closely by the driving torque so that they secure a firm grip, what results in direct drive of the third shaft 145 by the secondary shaft 52. When, however, runners are revolving in the reverse direction, wedges 138, rollers 140 and ring gear 152, being in contact, are pressed together more closely by the reverse driving torque, so that they secure a firm grip with result that the ring gear 152 drives the gear 153 and the gear 154 drives the gear 144, and consequently the third shaft 145 in reverse direction.

In order to increase the guidance of the fluid at heavy loads and to eliminate shocks and eddy currents, especially at high speeds, I have located two series of semi-free guide vanes 123 and 176 at exit from the second runner. These vanes are pivoted at their leading edges, adjacent to the outlets from the second runner blades, and adjust themselves to the direction of discharge from said runner, so that the fluid flows through these vanes 123 and 176 without shock or impact. Each vane is mounted on a fixed pivot 124 or 177, resp.; one end of pivot is screwed in a rear end of shroud 70, while the other end extends through the cover 41 or casing 40 and is rigidly secured to the same by nut 125 (or 178 resp.). Screws 126, 126A, 179 projecting into the free vanes channel serve as stops and limit the movement of the vanes 123 and 176 (see also Figs. 9, 15, 28, 29) in one direction (176), or in both directions (123).

When stationary guiding vanes made from one piece are used in fluid turbotransmissions, it is possible to obtain very efficient transmission of power only when the difference in speed between the driving shaft and the driven shaft is some predetermined amount, and a transmission becomes less efficient the more this predetermined difference in speed is departed from. According to this invention the gates are provided with several sets of semi-free vanes, which are free to adjust themselves to the direction of the fluid flow in one direction, but are restrained from turning in the other direction. In operation and referring to Figs. 9, 15, 28, and 29, when the fluid enters the driven vanes 83 and 92 from the driving vanes 60 and 90, its velocity in the closed circuit has both a circumferential and an axial component, but at light loads the axial velocity of the flow is small, the turning moments of driving and driven vanes are substantially equal, hence no angular momentum needs to be imparted by gates and consequently the driven vanes are set at such an angle that the fluid enters semi-free vanes practically in the same angle, as it leaves the gates (see Figs. 29, 15, and compare with Figs. 25, 26, left). The flow indicated by arrow in Figs. 29 and 15 impinges on back of vanes 123, which thereupon turn about their pivots 124 and adjust themselves to the direction of the flow, offer negligible resistance to the flow and cause no deviation in the flow (no angular momentum). Similarly when the fluid encounters the semi-free vanes 176, they turn about their pivots 177, but by smaller angle than vanes 123, and adjust themselves to the direction of the flow, and the fluid passes across them without any change of direction or without impact. The fluid now passes across the face of gates 68 which alter the direction of the flow very slightly so the angular momentum imparted is negligible.

When starting or at heavy loads (Figs. 9, 18 and 28, compare Figs. 25 and 26 right) fluid leaves the vanes 92 substantially in the axial direction, possessing high velocity of flow and great pressure energy, and enters semi-free vanes 123 in the direction indicated by arrow in Fig. 28 and therefore impinges the face of said vanes which are restrained from backward turning by the screws 126 and consequently alter the direction of the flow. The same happens when the fluid enters the vanes 176, which are restrained from backward turning by the screws 179, and, therefore, alter the direction of the flow still more, so the fluid when leaving the gates 68 and returning to the driving vanes 60 possesses great circumferential speed (pressure energy was changed into velocity energy by means of vanes 123, 176, 68) and powerful angular momentum, which momentum adds to the angular momentum imparted by the impeller.

It will be seen that with varying speeds of the driven vanes 83, 92 varying effects on the vanes 123, 176 and 68 will be produced, the effect being in each instance that the fluid enters semi-free vanes or gates at an angle which ensures minimum loss of energy due to shocks. In Fig. 1 two sets of semi-free vanes are illustrated, in Fig. 8 one set is shown; it can be seen that any number of vane sets can be provided.

The casing 40 is completely filled with a fluid, this may preferably be an oil. Leakage is prevented by stuffing boxes 48 and 47. From the standpoint of efficient operation as well as commercially the presence of a predetermined amount of fluid in the casing is absolutely imperative. However, high pressure under heavy load, centrifugal force, natural wear of packing or other sealing means around shafts and other factors, tend to cause leakage from the casing. Commercially any leakage, at standstill or when driving, is especially on high grade automobiles absolutely prohibitive; therefore I have provided a simple, automatically operating means for delivering the fluid to the casing at all times during operation from a storage chamber which catches any loss of fluid; I have equipped my transmitter with stuffing boxes which are automatically adjusted, whenever natural wear re-inquires, and I have provided said stationary storage chamber which would catch any fluid leaking through stuffing boxes during operation or at standstill.

Figure 2:
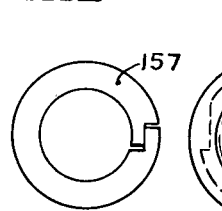
Fig. 2 is a side view of a packing ring used in a stuffing box.
Figure 4:
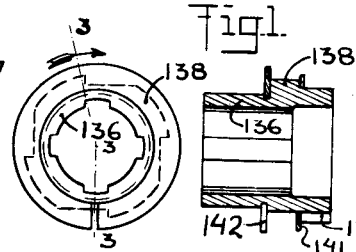
Fig. 4 is a front view.
Figure 3:
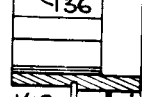
Fig. 3 is a longitudinal vertical section through a driving member of a ratchet mechanism.
Figure 5:
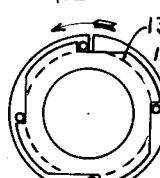
Fig. 5 is a rear view of the same driving member.
Figure 6:
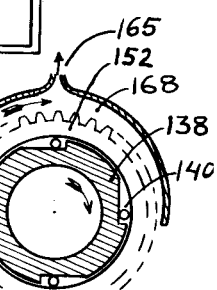
Fig. 6 is a vertical section of the transmission taken on line 6—6 of Fig. 1 showing roller ratchet mechanism for reverse drive and oil pumping mechanism.

In order to make stuffing boxes as tight as possible, the stuffing box 48 is provided with expansion split rings 157 and with contraction split rings 158 (Fig. 2), preferably from a springy metal so to stand up long wear. These rings act in similar way as piston rings in an engine and produce a pressure against the shaft and against the cover radially and axially due to their triangular shape and due to the pressure of a spring 159; force of this spring is adjustable by means of a gland 160 and bolts 161; said spring eliminates any clearance between rings, shaft and cover which might occur due to natural wear. The gland 160 is provided with a fluid collecting groove 162, to which is connected a fluid drain pipe 163; the other end of the pipe 163 runs into the gear case 41. Fluid level in the gear case is kept by the car operator at the time when filling with fluid is being made to a horizontal line 164—164 which is located well under the shaft 145. Any fluid which passes packing in stuffing boxes 47 and 48 is drained into the gear case 41. This case serves also as a reserve tank for the fluid which is used in the transmitter. The mechanism which delivers fluid back to the casing 40 from the storage case 41 consists of: pipe 165, check valve 166 and pipe 167 projecting into the casing 40. The lower opening of the pipe 165 is provided with a chamber 168 (see Fig. 6) which is located right at the periphery of the gear 152; fluid is driven into this chamber 168, and further into the pipe, by the teeth of the gear 152. Rotation of the flange 129 owing to its roughness puts all fluid in the space 131 into rotation, which rotation creates centrifugal force; due to this centrifugal force a difference in pressure is created in the space 131, with increase in pressure at the periphery of the flange and decrease in pressure further toward the center. At light loads all the kinetic and pressure energy is absorbed by the runner, therefore substantially atmospheric pressure exists in the space between the runner vanes 92 and vanes 123. Owing to the difference in pressure in space 131 due to centrifugal force a suction results in pipe 167 which opens a check valve 166 for the fluid and draws the fluid from chamber 168. Only little fluid is necessary because the loss through stuffing boxes is very small. The fluid will not escape from the case 40 through pipe 167, when the transmission is at rest, as the pipe is closed by a check valve 166. Of course, any pump, gear, centrifugal, piston or any other type, can be used for delivering fluid from the case 41 to the case 40.

Figure 15:
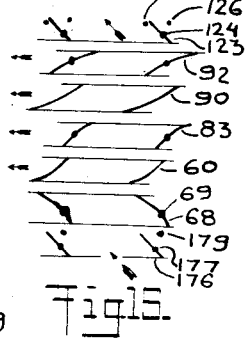
Fig. 15 illustrates a diagrammatic development of the shape of vanes in my power transmitter of Fig. 1, at light loads.

In reference to the impeller vanes 60 and 90 (Figs. 1, 10, 12) I have used vanes curved back, relatively to the direction of the fluid flow and to the impeller speed, at discharge Figs. 9 and 15. In reference to the runner blades 83 and 92 (Figs. 1, 9, 11, 15, and 18) they must be at heavy loads and slow speeds more similar to stationary guide vanes (diffusion vanes) as used on axial pumps for changing the water velocity into the pressure, because fluid energy is only partly absorbed by runner blades, and the remaining part of kinetic energy is changed partly into the pressure energy which pressure is needed so the large quantity of fluid passing through the gates could obtain enough kinetic energy and angular momentum great enough for overloads; therefore, the runner vanes are diverging at heavy loads, see Fig. 25, right. If the fluid in front of the semi-free vanes would not possess sufficient pressure, the quantity of the fluid flowing through the gates would not be great enough to obtain extra large angular momentum for turbine runner at overloads. The runner blades are curved forward at entrance (relatively to the direction of fluid and runner) at heavy loads.

At light loads, however, speed of the runner is great, therefore, the correct angle between the linear speed of the runner blade and relative velocity of the fluid in runner must be also large (see Fig. 25 left) in a similar way as on high speed water turbines. This invention fulfills all these conditions because the runner blades are adjustable. Further, at light loads, when torques and speeds of the impeller and the runner are practically equal (neglecting friction), the blades 83 and 92 must be similar to vanes as used today on the reaction type of water turbines, i. e. channels between the runner blades form a gradually contracting contour (see Figs. 24 and 25, left). Because at light loads torque of the impeller $t$ equals practically torque of the runner $T$ and guide vanes are not imparting angular momentum in the fluid then as much of angular momentum of the streaming fluid is absorbed by the runner as is imparted by the impeller, consequently: the entrance angle of the runner blade equals the discharge angle of the impeller blade, and the discharge angle of the runner blade equals the entrance angle of the impeller blade; the runner blades at light loads are curved backward at the entrance.

When blades of the runner are turned further so that entrance angle of the runner blade is smaller than discharge angle of the impeller blade, the runner has a tendency to rotate faster than the impeller and my apparatus becomes to be an overrunning transmission, where the driven shaft has a smaller torque than the driving shaft. Advantage of this is increase of economy, better loading, and less wear of engine.

Figs. 24A and 25A illustrate a diagrammatic development of impeller and runner blades as shown in Figs. 1, 10, 12 and 14 at light load. Here for impeller: $x$ smaller than $y/2$, hence blade area smaller than one-half of the area of the impeller; for runner: X smaller than Y; hence: blade area smaller than area of the runner. Further: approximately minimal pitch at the hub, $y$ min.$=.4y$ max., where $y$ max. is the maximal pitch at the periphery; hub diameter equals .4 impeller diameter, therefore:
$x$ smaller than $$\frac{y_{max.}}{2}$$

then: $x$ approximately equal or smaller than $y$ min., in other words: blade length of the impeller must be about equal or smaller than minimal blade spacing, in this case whole impeller blades are of noncell-shaped form from hub to periphery.

This structure causes new results as already described and makes the invention not sensitive when quantity of fluid changes and when entrance angles vary, because the fluid is not guided more than necessary.

In Fig. 8 I have illustrated a single stage turbo torque converter similar to that shown in Fig. 1 equipped with: stationary radial flow gates 230, axial pump impeller with wing shape blades 231, axial turbine runner with wing shape blades 232 which are adjustable and rotatable about pivots 235, one set of semi-free vanes 234 pivotally supported by bolts 236 whose angle of deviation is limited by screws 237. Automatic adjustment, from low to high speed, of the runner blades is accomplished by springs 238, and non-automatic adjustment (neutral, reverse) is accomplished by pressing on a foot pedal 239. Function of this device at varying loads and speeds is illustrated in Figs. 24, 23, 25, 26, 27, by their velocity diagrams. There is also provided a pipe 163B to drain any leakage of the working fluid into a storage chamber 42B; a check valve 166B and an opening 167B to deliver the fluid from the storage chamber back into the main circuit; the valve 166B is opened and fluid is drawn into the main circuit by sucking action of the impeller; a primary shaft 51B driven by a power engine and a secondary shaft 52B driving propeller shaft of the vehicle, and other parts similar to those as described on apparatus shown in Fig. 1.

In Figs. 19, 20, 21, 22, and 30 the numerals 180 up to 184 inclusive indicate primary or driving shafts which are connected to power engines or other sources of energy (not shown). The numerals 185 up to 189 incl. indicate secondary or driven shafts, numerals 190 up to 197 incl. indicate primary or driving vanes and wheels mounted and secured to the primary shafts; numerals 198 up to 205 incl. secondary or driven vanes and wheels mounted and secured to the secondary shafts, numerals 206–210 incl. third non revolving, angular momentum increasing gates, numerals 211–215 incl. indicate stationary fluid tight casings.

Figure 19:
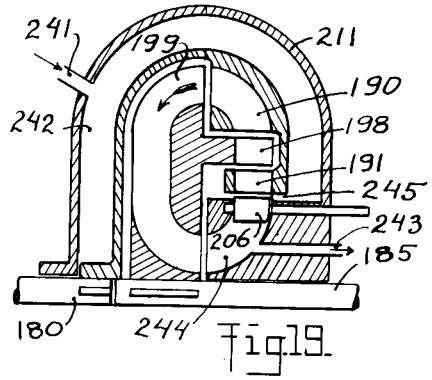
Fig. 19 is a half vertical section diagrammatically showing a form of a multistage transmitter equipped with impellers and runners with substantially radial flow of the fluid.

Fig. 19 illustrates a torque converter for an internal combustion engine which uses water as power transmitting medium. Its operation is as follows: a driving shaft 180 rotates primary blade wheels 190, 191, creating pressure and velocity energy in the circulating water, a driven shaft 185 is rotated by secondary blade wheels 198, 199. In the main circuit the water circulates in the direction of arrow; in portion 244 of the main circuit water possesses considerable pressure, especially at heavy loads, due to the energizing action of the primary blade wheels and due to pressure increasing action of the secondary blade wheels. When, however, the water passes gates 206 whose function is to change pressure energy into velocity energy, the water possesses only little pressure. Directly at the exit of the gates is a clearance space 245 connected to a space 242; consequently, the same low pressure will exist in space 242 and in opening 241, which opening connects said low pressure space with a discharge from a radiator of the power engine, while an opening 243 connects the higher pressure portion 244 with an intake of said radiator.

Figure 20:
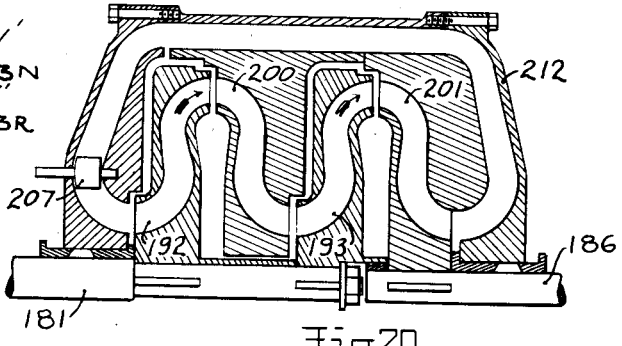
Fig. 20 is a half vertical section diagrammatically illustrating a multistage transmitter with both the impeller and runner vanes of S shape.

In a device according to Fig. 20 a fluid enters impeller channels in an axial direction, and after passing through a double bend of 90° it leaves the impeller channel in an axial direction. The fluid flows in a similar manner through the runner channel. This type of fluid torque converter has an advantage that the outside diameter of casing can be smaller than casing of the type shown in Fig. 21.

Figure 21:
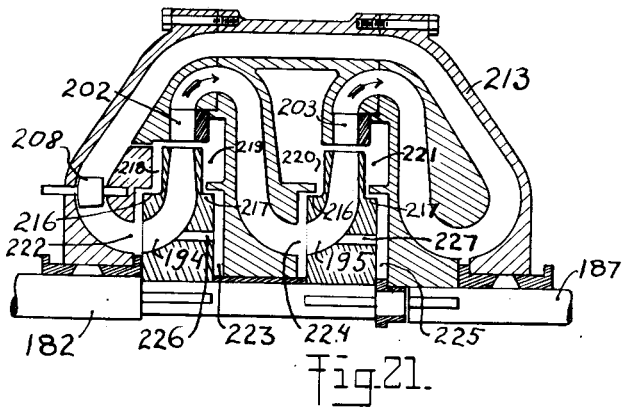
Fig. 21 is a half vertical section diagrammatically illustrating a multistage transmission equipped with impellers and runners with substantially radial flow of fluid, each runner being located at the periphery of its corresponding impeller.

Fig. 21 illustrates a power transmitter with the circulating fluid guidance also in a wave-like direction. After leaving impeller, the circulating fluid is carried in a radial direction through the runner vanes and then turned in the reversing channels. In this design the axial thrust of each impeller or runner is balanced individually; each impeller has two packing rings 216 and 217 which form close clearances with corresponding rings fastened to the runner on both sides of the impeller. By making the clearance at the outer rim of the impeller sufficiently large, equal pressure will exist in spaces 218 and 219, 220 and 221; spaces 222 and 223, as well as 224 and 225 on the inside of the packing rings are connected by a sufficient number of holes 226 and 227 through the impeller hubs. Then the spaces 222 and 223, as well as spaces 224 and 225 have also the same pressure. With this arrangement it is possible to do away with axial thrust; it is quite an advantage to balance each impeller separately.

Figure 22:
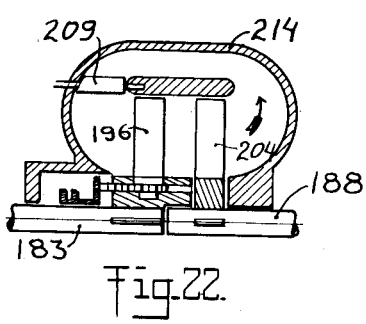
Fig. 22 is a half vertical section illustrating my axial transmission with fixed runner vanes but with adjustable impeller vanes.

It can be noticed that the fluid circulation (marked by arrow for "forward drive") in a device shown in Fig. 22 runs in the opposite direction, when adjustable blades of impeller 196 are turned for "reverse drive".

Fig. 30 represents a torque converter similar to the device shown in Fig. 8 with an axial impeller 197 but with a runner 205 partly radial with inward flow and partly axial. The advantage of this type of runner is that it is more and quicker self-governing than the pure axial type, in a similar way as the Francis turbine, because: any increase in the speed of rotation by increasing the centrifugal pressure of the fluid at the outer periphery of the runner wheel tends to reduce the flow into the wheel, any decrease, however, in the speed of rotation tends to increase the fluid flow.

If it happens that one more stage is to be added to the multistage power transmitter of Fig. 1, in order to increase its power transmitting capacity, it can be easily accomplished as follows: make casing 40, shroud 70, cylinder 61, hub 89 and shaft 52 properly longer and insert one more impeller and one more runner; the other parts can be used as they were. In this way my device is very flexible with reference to power transmitting capacity.

*Theory of turbo torque converter*

In order to make theory and calculation of this simple and short I have drawn up velocity diagrams Figs. 23 up to 27 incl. in reference to the device shown in Fig. 8. However, it can be readily seen that function of the device according to Fig. 1 is practically the same, but the calculation is more complicated, because of multistage construction of said device.

With reference to the velocity diagrams, well known from textbooks on turbines and centrifugal pumps, see Figs. 23 up to 27 incl. the following notations will be employed:

For the impeller:
$i$—angular velocity of the impeller,
$r$—effective radius from the axis of rotation,
$f$—velocity of flow or circulation,
$v$—absolute velocity of fluid,
$w$—velocity of fluid relative to the impeller,
$u$—linear velocity of a point at the effective radius of the impeller, and equals: $ir$,
$a$—angle between $v$ and $u$ at entrance,
$b$—angle between $w$ and $-u$ at entrance,
$c$—angle between $w$ and $-u$ at discharge,
$d$—angle between $v$ and $u$ at discharge,
$s$—tangential component of $v$ which equals $v \cos a$ at entrance or equals $v \cos d$ at discharge, velocity of whirl,
$l$—area of flow normal to $f$,
$k$—weight of fluid per cubic ft.
$q$—pounds of fluid flow per second equals $klf$,
$t$—torque exerted by the impeller or angular momentum of fluid imparted by the impeller,
$n$—revolutions per minute,
$g$—acceleration of gravity equals 32.2,
$p$—increase in fluid pressure in the impeller,
$e$—energy imparted by the impeller,
$h$—head of fluid imparted.
$x$—true length of the blade profile,
$y$—spacing of the blades,
$zz$—trajectories drawn perpendicularly to the streamlines.

For the runner same letters will be used but in capital letters: I, R, F, V, etc.

For the gates capital letters with a superscript ('') will be employed: I'', R'', F'', V'', etc.

The superscript (') will refer to the stream at inlet, and the superscript (°) at outlet.

As known from textbooks on hydraulics: The moment of momentum or the angular momentum of fluid entering the impeller per second about the axis of rotation equals:

$$t' = q/g \ s'r' \quad (2)$$

The final angular moment of fluid leaving the impeller about the axis of rotation equals:

$$t° = q/g \ s°r° \quad (3)$$

Change of angular momentum equals turning moment or torque exerted by the impeller:

$$t = t° - t' \quad (4)$$
$$\text{or:} \quad t = q/g \ (s°r° - s'r') \quad (5)$$

Change of fluid energy when passing through the impeller or energy imparted to the fluid by the impeller equals to the work done by the moment $t$ in equation (5):

$$e = q/g \ (s°u° - s'u') \quad (6)$$

For axial impeller as shown in Fig. 8: entrance radius equals discharge radius, or: $r' = r° = r$ and $u' = u° = u$ then $$t = qr/g \ (s° - s') \quad (5a)$$
$$e = qu/g \ (s° - s') \quad (6a)$$

In similar way for the runner we obtain: The angular momentum of fluid entering the runner about the axis of rotation equals:

$$T' = Q/g \ S'R' \quad (7)$$

The final angular momentum of fluid leaving the runner:

$$T° = Q/g \ S°R° \quad (8)$$

Turning moment of the runner or angular momentum absorbed from fluid by the runner equals: $T = T° - T'$; neglecting small hydraulic losses $q = Q$, and for axial runner as shown in Fig. 8: $R' = R° = r$, and: $U' = U° = U$, then:

$$T = qr/g \ (S° - S') \quad (9)$$

Energy extracted from fluid by the runner equals the work done by the moment T in equation (9):

$$E = qU/g \ (S° - S') \quad (10)$$

The angular momentum of fluid leaving the gates about the axis of rotation equals:

$$T''° = q/g \ R''°S''° \quad (11)$$

Angular momentum of fluid imparted by the gates and semi-free vanes equals: (neglecting hydraulic losses $Q'' = q$)

$$T'' = q/g \ (R''°S''° - R'''\ S''') \quad (12)$$

As there is no other source in the fluid circuit imparting or absorbing energy except impeller and runner, consequently energy imparted to the fluid and absorbed from the fluid must be in balance under running conditions, therefore (neglecting friction):

$$e - E = 0 \quad (13)$$

Similarly, because there are only in the fluid circuit gates, impeller and runner as sources to change angular momentum of fluid, it is apparent that angular momentums of gates, impeller and runner must be in balance, i. e.:

$$t + T'' + T = 0 \quad (14)$$

or, as it is an accepted law of mechanics that wherever there is a turning moment, there is an equal and opposite torque reaction:

$$t + T'' = -T \quad (14a)$$

It is to be noted that at light loads the speed of the runner is almost the same as the speed of the impeller, and because angles $c = B$ and angles $b = C$, see velocity diagrams Figs. 24, 25, 27, consequently there are no shock losses, because entrance and exit angles are correct, of course there is a little difference in actual angles owing to runner slip.

Large clearances between the gates, the impeller, and the runner, are also of great importance for a turbo-transmission using wheels with a small number of vanes, because streamlines of the fluid flowing through wing-shape vanes require certain space to adjust themselves.

For a similar reason wing-shaped vanes of an axial type transmission must be slightly more curved than calculation determines, that is: angles $b$ and $C$ are made smaller, about 2°, and angles $B$ and $c$ are made larger, about 5°, than calculated; that is because stream-lines more distant from vanes do not deflect as much as stream-lines closer to vanes, and the whole amount of the fluid flowing through the impeller or the runner only experiences a mean deflection, when the size of the wetted blade surface is limited, and blades themselves are substantially noncell-shape.

The specific speed of a turbine torque converter directly coupled to a modern automotive engine is far above speeds known in hydraulic turbines. Therefore relative and absolute velocities of fluid are exceedingly high, and new methods of design must be used, if satisfactory efficiency is to be obtained. To this end impellers in Figs. 1 and 8 have only two blades (see Figs. 10 and 12) so that the area of all the blades of an impeller does not exceed one half of the circular area determined by the diameter of the impeller wheel. However, runners in said figures have five blades (see Figs. 12 and 14) so that the area of all the blades of each runner is greater than the impeller area but still does not exceed the circular area determined by the diameter of the runner wheel. This limit was deduced from the following: good efficiency of high speed turbo-transmissions can be secured only if the true length of the blade profile $x$ is smaller than the blade spacing $y$, then the fluid is guided sufficiently so the runner is fully effective and still entrance shock losses as well as friction losses are kept small. In the case of impeller, however, care must be taken to so regulate the impeller that a permissible turning moment is not exceeded because the engine would slow down. Hence for the impeller: the true blade length $x$ is smaller than one half of blade spacing $y$ (Fig. 24A). From Fig. 25A it can be seen that area of all the blades is approximately equal to the circular area of the wheel, when trajectories $z_1$, $z_1$ and $z_2$, $z_2$ coincide or when: $X = Y$. It is of advantage when $X$ is greater than $Y$ at the hub, but smaller than $Y$ at the periphery, but the ratio of blades area and circular area remains unchanged. In this case the width of the blades at the hub is greater than at the periphery because of strength and fluid guidance requirements. The areas of the various runner blades need not be alike, for instance narrow blades can be interposed between wide blades as is well known in turbine or pump practice, as long as the area of all the blades does not exceed the circular area of the runner. In this case the mean deflection of the flow through the runner is not sudden nor severe but is soft, or cushioned because of the shortness of the guidance through the runner; any dangerous increase of the turning moment on the part of the engine is thus avoided.

Therefore for impeller $x$ smaller than $y/2$ for runner: $X$ smaller than $Y$.

In Figs. 24 and 25, left, actual entrance angle of the impeller as well as discharge angle of the runner are smaller than corresponding angles $b$ and $C$ shown in velocity diagrams in the same figures. The reason for this is that streamlines close to blades of course must follow the contour of the blades, but streamlines further between the blades follow the blade contour only partly and the whole amount of fluid flowing through the blades only experiences that mean deflection, which corresponds to the angles shown in mean velocity diagrams, which illustrate mean effective angles and not actual angles. These actual angles at impeller inlet and runner discharge can be made almost zero especially for runner in order to properly deflect the fluid passing through the impeller and runner without increasing number of vanes or length of vanes, by avoiding the usual cell-shaped form of the blades.

From the same reason of mean deflection of streamlines, the impeller exit angle $c$ as well as the runner inlet $B$ angles must be increased. This decrease, respective increase, of actual angles depends also on the number of vanes: the smaller number of vanes, the greater the difference between actual angles of blades and mean effective angles of velocity diagrams. I have found that the increase of impeller outlet or runner inlet can amount up to 15 degrees. The decrease, resp. increase, of actual angles must be greater for the impeller than for the runner, because the number as well as the area of impeller blades is considerably smaller than the number and the area of runner blades, i. e., the smaller the number and area of blades the greater the difference between actual angles and calculated angles. For guide wheel, however, the length of vanes is greater than spacing (see Fig. 23) and of course the wetted area of guide vanes is greater than twice the area of the surface of revolution generated by the rotation of said wheel around its axis, in fact, see Fig. 12, the area of guide vanes is greater than area of impeller and runner vanes put together. Also the number of vanes in the mechanism of Fig. 1 was selected in the same way and from the same reason: 2 impeller vanes, 5 runner vanes and 8 guide vanes: $2 + 5 < 8$.

According to the effective velocity diagrams, see Figs. 23 up to 27 incl., entrance and exit angles can be calculated. In calculating a new turbo transmission for a definite engine, formulæ 5, 6, 9, 10, 12, 13, and 14 are to be used. Torque and horsepowers of power engine equal then torque and horsepower of the impeller; desirable speed and gearing ratio $t:T$ is given by the service conditions. On this basis velocity of whirl and flow can be determined; whirl velocity and flow then determine relative velocity, for inst. see Fig. 24:

$(u-s)^2 + f^2 = w^2$ or in Fig. 25: $(U-S)^2 + F^2 = W^2$

Finally, when relative velocities are known, mean effective vane angles, i. e. angles of vanes corresponding to actual torque and power required for the impeller and actual torque and power available from the turbine runner, can be calculated. When the transmission is built, these angles can be determined or refigured from values obtained by a dynamometer.

These refigured effective angles increased, resp. decreased, by a definite increment, resp. decrement angle (the smaller this increment, resp. decrement, the larger the number or area of vanes, and vice versa) must be equal to actual vane angles. In this way correctness of vane angles can be checked, after the transmission is built.

The relative velocities being known, then:
For impeller: $f' = w' \sin b$, $f° = w° \sin c$, from which: $\sin b = f'/w'$ $\sin c = f°/w°$.
For runner: I have in similar way:

$$\sin B = F'/W'$$
$$\sin C = F°/W°.$$

For infinite number of blades on a wheel these angles will be actual angles of blades, for limited number of blades angles b and C must be smaller than calculated and angles c and B must be larger, in other words the curvature must be increased, when small number of blades is used.

After all it is the ratio of blade area to the circular area of impeller or turbine which influences mean deflection of streamlines more than the ratio of blade length to pitch i. e. $x/y$, because the $x/y$ ratio should not be constant for whole length of blades but should be greater in vicinity of hub, in order to prevent back flow of fluid at low speeds, and should be smaller at periphery, to keep down friction losses due to high peripheral speed of blades.

The impeller inlet angle b and the runner outlet angle C can be considerably reduced below the values used in ordinary practice, minimal angle is usually about 15°, see Gibson's Hydraulics, 3rd edition, page 518. Fig. 25, left, shows the actual outlet blade angle about zero; but the outlet angle even below zero, i. e. negative, can be used, if the wetted blade surface is reduced below the limit indicated above.

Fig. 25, left, illustrates runner vanes in their "reaction" position, discharge angle being smaller than intake angle, and the pressure in the runner decreases due to the convergent form of vanes at light loads. Fig. 25, right, shows runner vanes in their "antireaction" position, discharge angle being greater than intake and the pressure in the runner increases due to the divergent vanes at heavy loads.

As drawn in Figs. 1 and 8, the outside diameter of the hub is about four tenths of the impeller, resp. runner, diameter. If the hub diameter is selected too small, the fluid is liable to stream backwards in the vicinity of the hub especially at low speeds, if the hub diameter is greater than the indicated value, then there is unnecessary loss of space, the channel area is reduced and the friction increased due to higher speeds. This rule must be applied to all turbo-transmitters, whenever there is an axial or nearly axial discharge or intake.

In reference to main gates 68 in Fig. 1 or gates 230 in Fig. 8: as shown the discharging edges of the gates project partly over the wall of the impeller inlet but leave a bladeless space between the gates outlet and the impeller inlet. In this way the friction losses of flow when passing through the gates are reduced because the discharge area of the gates is considerably increased when fluid can escape from the gates not only radially but also axially. Friction losses which usually occur in a curved channel, of such design as the one interposed between the gates and the first impeller of my device are also reduced because the natural flow of fluid is not forced to change its direction, there being no blades in this space. At the same time the gates are located as far as possible from the axis, so the gates can increase greatly the turning moment of fluid without deflecting flow to a sharp angle which would result in increase of friction losses; at the same time the clearance between the gates can be increased, the gates can be comparatively short and are easier to regulate. It is evident that these advantages can be also realized if the gates do not project into the bladeless space.

It is of importance to notice that flow deflecting bladeless space does not require a great curve of the flange 128 (in Fig. 1) but rather a small, sharper curve as shown, to obtain a natural flow.

Another similar bladeless space is located at the discharge from the last runner and its function is just similar to function of the bladeless space at the entrance into the first impeller, the only difference being that flow in this space is opposite.

It will be seen that the gist of my invention of reversible turbine torque converter consists broadly in provision of movable wing-shaped blades which can be adjusted automatically or manually, while in operation.

What I claim is:

1. A fluid apparatus for transmitting power, having a rotary blade wheel impeller energizing the fluid, a rotatable blade wheel turbine runner driven by said fluid, a guide wheel with curved vanes changing angular momentum of said fluid and a casing filled with a driving fluid and enclosing said impeller, said runner, and said guide wheel, said wheels comprising the circuit in which said fluid circulates, said runner wheel equipped with movable and adjustable blades, said adjustable blades at light loads being convergent i. e. of reaction pressure decreasing type, said adjustable blades at heavy loads, being divergent i. e. of the anti-reaction pressure increasing type.

2. Power transmission mechanism comprising a path for fluid including rotary driving vanes, a first shaft connected to rotate said vanes, rotary driven vanes, a second shaft aligned with said first shaft and connected to rotate with said driven vanes, and gates, said driven vanes being movable and their angular position in the path of fluid being adjustable automatically under the control of said fluid, said driven vanes being reversible at will, while in operation, said gates being interposed between the exit from said driven vanes and the entrance to said driving vanes.

3. A fluid torque converter for transmitting power, comprising an impeller having wing-shaped blades with a front blade area smaller than one half the area of the surface of revolution generated by rotation of the impeller around the impeller axis, a turbine runner wheel having blades with blade area larger than the blade area of said impeller, a guide wheel with guide vanes, a casing containing a driving fluid and enclosing said impeller, said runner, and said guide wheel, large clearance spaces being provided between said guide wheel and said impeller, between said impeller and said runner, and between said runner and said guide wheel.

4. A fluid device for transmitting power, having a casing, a fluid in said casing, a guide wheel with gates, and impeller wheel with curved vanes, and a runner wheel with curved blades in said casing, said runner wheel comprising a hub and a sleeve movable relatively thereto, said blades being movable and pivoted on said hub, connecting means between said sleeve and said blades, means capable of displacing said sleeve axially for adjusting the angular position of said blades, means to make said runner blades immovable and rigid in reverse speed and neutral position also to make said blades yieldable in lower speed position of said blades, said guide wheel interposed between the exit from said runner and the inlet in said impeller.

5. A fluid device for transmitting power, having a stationary casing, a circulating fluid, a stationary guide wheel with gates to change angular momentum of the fluid, an impeller energizing the fluid and a runner driven by said fluid in said casing, said runner comprising a movable sleeve, a hub, blades movably mounted on said hub, each blade provided with a gear, rods provided with gear teeth connecting said gear with said sleeve, and means for axially displacing said sleeve relative to said hub for adjusting the angular position of said blades, by means of said rods.

6. In combination an engine having a flywheel and a stationary flywheel housing, a fluid power transmitter comprising a plurality of driving members connected to said flywheel energizing the fluid and a plurality of driven members with movable blades receiving energy from the fluid a guiding member adapted to increase the angular momentum of the circulating and power transmitting fluid, a casing fastened to said housing and enclosing said members, a clutch having a driving part and a driven part, said driving part connected to said driving member of the transmitter and said driven part of said clutch secured to said driven member, and means to engage and disengage said clutch while in operation, said means also to turn the angular position of said blades.

7. A reversible turbine power torque conveter comprising a passage for fluid including driving vanes, movable and reversible driven vanes, and guide vanes interposed between the exit from the driven vanes and the entrance to the driving vanes, discharge angle of said guide vanes being smaller than 75 deg., and means for turning said driven vanes to adjust their angular position so as to cause forward, or reverse rotation.

8. A reversible turbine torque converter comprising a passage for fluid, including driving vanes, reversible dirven vanes and guide vanes interposed between the exit from said driven vanes and the entrance to said driving vanes, angular position of said driven vanes being adjustable so as to change rotating direction of said driven vanes.

9. A turbine power torque coverter comprising a passage for fluid including a plurality of driving wheels with blades working in series, a plurality of driven wheels equipped with blades working in series, and single stage guide vanes, said guide vanes interposed between the exit from the last driven wheel and the entrance into the first driving wheel, length of said blades in direction of flow being smaller than spacing of said blades, one part of said wheels having blade area smaller than the area of the surface of revolution generated by rotation of said wheels around their axis, another part of said wheels having a blade area larger than the area of revolution of said wheels.

10. A reversible turbine power torque converter comprising a passage for fluid including a plurality of pump impellers working in series, a plurality of turbine runners working in series, single stage stationary guide vanes interposed between the exit from the last runner and the inlet in the first impeller, vanes of said turbine runners being pivotally adjustable, and means for turning said pivoted vanes to reverse the rotation of said runners.

11. A reversible turbine power torque converter comprising a passage for fluid including driving vanes, driven vanes, and stationary gates interposed between the inlet to the driving vanes and the exit from the driven vanes, said driven vanes as well as said gates being pivoted and automatically adjustable under the control of the fluid, also being adjustable, at will, while in operation, to control the direction of said driven vanes rotation, and means to put said gates out of action, while in operation, and means to make said driven vanes ineffective while in operation.

12. In a fluid power transmission a casing, fluid and blade wheels in said casing, a fluid channel in said blade wheels, said fluid being capable of circulating in said channel and adapted to transmit power from driving wheel to driven wheel, entrance angle of the driving blade wheel and exit angle of the driven blade wheel being smaller than corresponding angles calculated on basis of mean effective velocity diagrams, the difference between the actual and the calculated angle being greater for a wheel with smaller blade area but being smaller for a wheel with greater blade area.

13. In a fluid power transmission a casing, fluid and blade wheels in said casing, a fluid channel in said blade wheels, said fluid being capable of circulating the power transmitting from driving wheel to driven wheel in said channel, exit angle of the driving blade wheel and inlet angle of the driven blade wheel being greater than corresponding angles calculated on basis of mean effective velocity diagrams, the difference between the actual and the calculated angle being greater for a wheel with smaller blade area but being smaller for a wheel with greater blade area.

14. In a fluid power transmission a casing, fluid, and blade wheels in said casing, a fluid channel in said blade wheels, said fluid being capable of circulating and power transmitting in said channel, some of said wheels having a hub, movable blades thereon, each blade provided with pinion gear, rods axially shiftable in said hub and provided with gear teeth meshing with said pinions, and means for axially displacing said rods for adjusting the angular position of said movable blades, at will, while in operation, means to make said blades yieldable, and means to lock said wheels by means of said rods for direct drive.

JOSEPH JANDASEK.